United States Patent Office 3,372,171
Patented Mar. 5, 1968

3,372,171
SULFATION USING AMIDOSULFONIC ACID IN AN INERT SOLVENT
Hermann Remy, West Warwick, R.I., assignor to Farbwerke Hoechst Aktiengesellschaft vormals Meister, Lucius & Brüning, Frankfurt am Main, Germany, a corporation of Germany
No Drawing. Filed Nov. 22, 1965, Ser. No. 509,180
Claims priority, application Germany, Dec. 2, 1964, F 44,585
3 Claims. (Cl. 260—374)

ABSTRACT OF THE DISCLOSURE

There is disclosed herein a method for the preparation of the blue acid dyestuff 1-amino-2-sulfonic acid-4-[2'-methoxy - 5' - (β - sulfato-ethylsulfonyl)-anilino]-anthraquinone by reacting 1 - amino - 2 - sulfonic acid-4-[2'-methoxy - 5' - (β-hydroxy-ethylsulfonyl)-anilino]-anthraquinone with amidosulfonic acid at an elevated temperature in the presence of an inert organic solvent.

---

I have found that a valuable blue acid anthraquinone dyestuff which has good tinctorial properties and corresponds to the formula

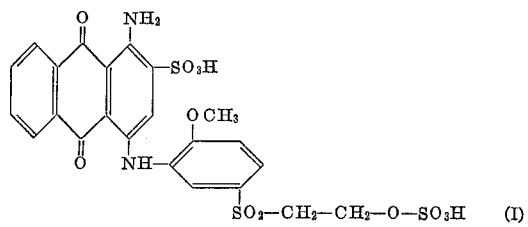

is obtained in a very good yield and high purity by causing amidosulfonic acid to act at an elevated temperature and in the presence of organic solvents on the compound of the formula

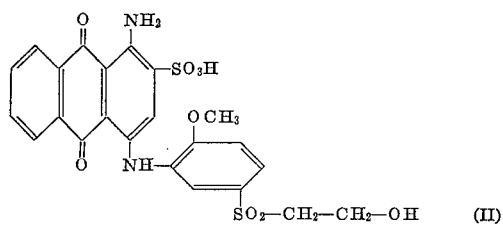

The esterification is advantageously carried out at temperatures above 60° C., preferably at a temperature within the range from about 75° to 105° C., and is terminated after a short period of time. The solvent which is present during the reaction is removed from the esterification mixture—advantageously after partial distillation under reduced pressure—by pouring the whole into water which has been acidified to a pH-value of 5. The dyestuff obtainable according to the process of the present invention is isolated from the aqueous solution in the usual manner by salting out.

As solvents suitable for carrying out the esterification there may be mentioned, for example, dimethylformamide, dimethylsulfoxide, quinoline, dimethylaniline, pyridine, picoline or lutidine or mixtures thereof.

The compound of Formula II which is used as starting substance can be prepared by known methods, for example by condensation of 3 - amino - 4 - methoxyphenyl-1-β-hydroxyethylsulfone with 1 - amino - 4 - bromoanthraquinone-2-sulfonic acid.

Up to now the known dyestuff of Formula I could be prepared only by esterification of the intermediate product of Formula II which contains β-hydroxyethylsulfonyl groups with the use of sulfuric acid.

However, the known process has the disadvantage that it requires for the esterification of the intermediate product containing β-hydroxyethylsulfonyl groups a large excess of concentrated sulfuric acid, alkali metal salts of chlorosulfonic acid or alkali metal bisulfates. Consequently, neutralisation and working-up of the reaction mixture are very troublesome and large amounts of salt accumulate. A further disadvantage of the known process consists in the fact that the neutralisation must be effected slowly and with the utmost care, for too high local concentration of alkali or local overheating in the esterification mixture would cause splitting off of sulfuric acid with formation of the vinyl-sulfone compound or re-saponification into the β-hydroxyethylsulfone derivative.

As compared with the esterification according to known methods with the use of large amounts of concentrated sulfuric acid, the process of the present invention is particularly valuable in that the neutralisation which may unfavorably affect the ester prepared is eliminated, since sulfuric acid is not used in excess as esterification component.

The blue acid anthraquinone dyestuff obtained according to the process of the invention dyes wool in a neutral to weakly acid medium brilliant blue shades of an excellent fastness to light and to wetting.

The following example illustrates the invention but it is not intended to limit it thereto, the parts being by weight unless otherwise mentioned.

*Example*

88.5 parts of 90% 1-amino-4-[N-(2'-methoxy-5'-β-hydroxyethylsulfonyl) - phenyl] - aminoanthraquinone - 2-sulfonic acid are introduced into 450 parts by volume of pyridine, and the mixture is heated to 75–80° C. 60 parts of amidosulfonic acid are then added. Within a few minutes the temperature of the reaction mixture rises to 95–100° C. and, after the evolution of heat has subsided, the mixture is kept at this temperature for 30 minutes by external heating. About 360 parts by volume of pyridine are then removed by distillation under reduced pressure and the residue is taken up with 800 parts by volume of water. The esterification mixture has then a pH-value of about 6.6 which is reduced to 6.0–6.2 by addition of dilute hydrochloric acid. After the mixture has been heated to 40–45° C., the ester is salted out by addition of potassium chloride, filtered after some hours, washed with a 10% potassium chloride solution and dried.

The dyestuff prepared according to the process of the invention which corresponds to the formula

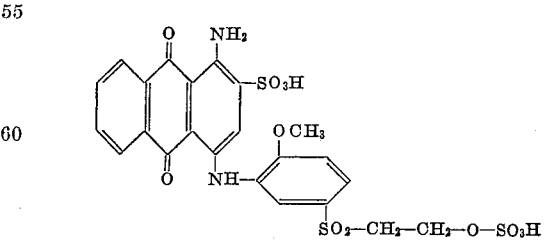

is obtained in very pure state and in a yield of 89 parts, corresponding to 97% of the theoretical yield.

Instead of pyridine there may also be used as solvents for carrying out the esterification quinoline, dimethylaniline, dimethylformamide, dimethylsulfoxide, picoline or lutidine or mixtures thereof.

I claim:
1. A process for preparing the blue acid anthraquinone dyestuff of the formula

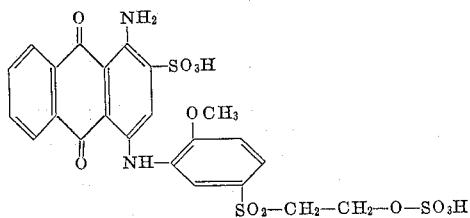

which comprises esterifying the compound of the formula

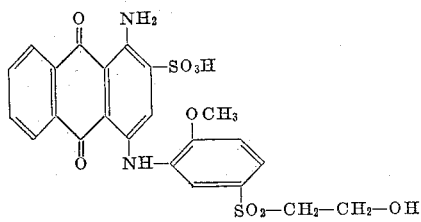

at an elevated temperature with amidosulfonic acid in the presence of an inert organic solvent.

2. A process as claimed in claim 1, wherein the esterification is carried out at a temperature within the range of about 75° C. to about 105° C.

3. A process as claimed in claim 1, wherein dimethylformamide, dimethylsulfoxide, quinoline, dimethylaniline, pyridine, picoline or lutidine or a mixture thereof is used as inert organic solvent.

References Cited

UNITED STATES PATENTS 2,758,177  8/1956  Knowles et al.
3,265,722  8/1966  Dudley _____ 260—458

OTHER REFERENCES

Gore, Chemistry of Natural and Synthetic Col. Matters, New York; Academic Press, Inc., 1962, pp. 481–482.

LORRAINE A. WEINBERGER, *Primary Examiner.*

RICHARD K. JACKSON, *Examiner.*

H. WEGNER, *Assistant Examiner.*